(12) United States Patent
Chervenka et al.

(10) Patent No.: US 7,748,202 B2
(45) Date of Patent: Jul. 6, 2010

(54) AGRICULTURAL HARVESTER SPEED CONTROL

(75) Inventors: Kirk J. Chervenka, Bettendorf, IA (US); Scott J. Petersen, Colona, IL (US)

(73) Assignee: Deere & Company, Moline, IL (US)

( * ) Notice: Subject to any disclaimer, the term of this patent is extended or adjusted under 35 U.S.C. 154(b) by 139 days.

(21) Appl. No.: 12/204,242

(22) Filed: Sep. 4, 2008

(65) Prior Publication Data
US 2009/0139194 A1    Jun. 4, 2009

Related U.S. Application Data

(60) Provisional application No. 60/991,200, filed on Nov. 29, 2007.

(51) Int. Cl.
*A01D 41/127* (2006.01)
(52) U.S. Cl. .................................. 56/10.2 G; 56/10.2 R
(58) Field of Classification Search ................... 37/348, 37/466, 468; 56/10.2 R, 10.2 A–10.2 J, 10.6–10.8, 56/11.1, 11.4, 13.5–13.9, 14.1–14.5, 119, 56/192, 344, 364, 372, 503; 701/50; 460/6, 460/116; 180/306, 307
See application file for complete search history.

(56) References Cited

U.S. PATENT DOCUMENTS

| | | | | |
|---|---|---|---|---|
| 4,727,710 A | * | 3/1988 | Kuhn | 56/10.2 G |
| 6,036,597 A | * | 3/2000 | Arner | 460/6 |
| 6,073,428 A | * | 6/2000 | Diekhans | 56/10.2 R |
| 7,213,389 B2 | * | 5/2007 | Teijido et al. | 56/10.8 |
| 7,261,632 B2 | * | 8/2007 | Pirro et al. | 460/6 |
| 7,549,287 B2 | * | 6/2009 | Foster et al. | 60/445 |

\* cited by examiner

*Primary Examiner*—Robert E Pezzuto
(74) *Attorney, Agent, or Firm*—Taylor & Aust, P.C.

(57) ABSTRACT

A computer-controlled method of controlling the speed of an agricultural harvester load that is coupled to an agricultural harvester engine by a power transmitting arrangement having various output speeds. The method includes the steps of electronically receiving a desired new load speed from an operator when the engine is operating at an initial engine speed, and electronically driving the power transmitting arrangement through a sequence of the various output speeds until the actual speed of the agricultural harvester load and the actual speed of the agricultural harvester engine are in the same ratio to each other as the desired new load speed and the initial engine speed.

15 Claims, 1 Drawing Sheet

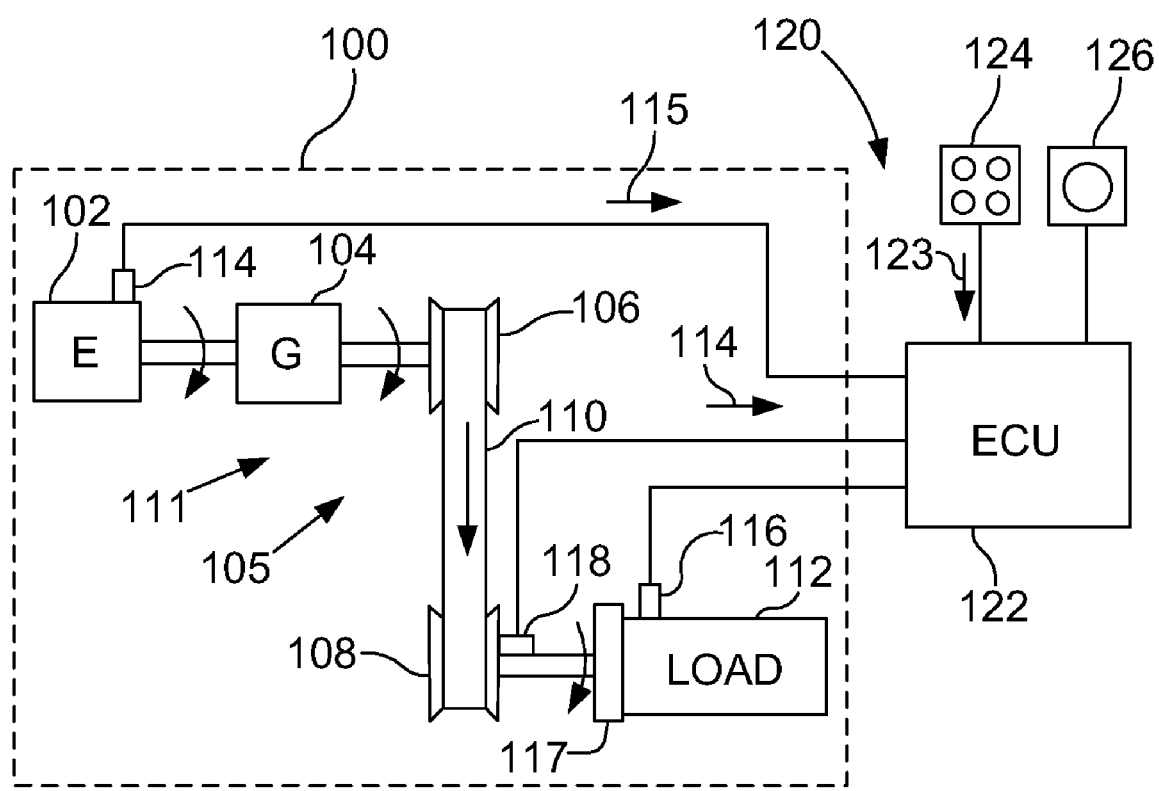

AGRICULTURAL HARVESTER SPEED CONTROL

CROSS REFERENCE TO RELATED APPLICATIONS

This is a non-provisional application based upon U.S. provisional patent application Ser. No. 60/991,200, entitled "AGRICULTURAL HARVESTER SPEED CONTROL", filed Nov. 29, 2007, which is incorporated herein by reference.

FIELD OF THE INVENTION

The invention relates generally to agricultural harvesters. More particularly, it relates to speed control of auxiliary equipment associated with agricultural harvesters.

BACKGROUND OF THE INVENTION

An agricultural harvester typically includes a self-propelled vehicle on which an engine and various pieces of auxiliary equipment are mounted. The engine, through several drive trains, drives the auxiliary equipment on the agricultural harvester which typically includes a large threshing rotor, cleaning fans, drive wheels, straw choppers, straw walkers, sieves, chaffers, and headers, among other devices.

Many of these devices are driven by mechanical devices such as gear boxes, rotating shafts, belts, pulleys, and hydraulic pumps connected to the engine. In one common arrangement, the engine is coupled to the large threshing rotor and to the cleaning fan by a drive train which includes a series of mechanical drive elements such as gear boxes driven by rotating shafts, belts and pulleys. In a common arrangement, one or more pulleys, having a variable pulley diameter, is disposed in the drive train between the engine and the threshing rotor or the cleaning fan, to control the speed of the rotor or the cleaning fan with respect to the engine.

One drawback of these variable pulleys is their slow response time. When a signal is sent to the variable pulley to command a change in its diameter, and thus a change in its speed relative to the engine speed, it takes a relatively long amount of time to affect this change. Variable pulleys cannot tolerate rapid changes in pulley diameter under load without suffering undue wear to the belt and pulley.

For this reason, adjustments are seldom made to the variable pulley diameter. Changes in the diameter of the variable pulley function to change the speed of the rotor or the cleaning fan with respect to the engine. As a general matter, the operator typically selects a new desired speed of the rotor or the cleaning fan, and the control system that controls the diameter of the pulley then establishes a new pulley diameter that will provide that new desired speed (assuming the engine keeps running at the same speed). The control system then stops adjusting the diameter of the pulley, at least until the operator requests a new desired speed.

If the load on the agricultural harvester increases, such as by running into a heavy crop or starting to climb a hill, then the engine speed will drop. When the engine speed drops, the rotor speed and the cleaning fan speed drop proportionally.

Similarly, if the load on the agricultural harvester is reduced, for example, by the crop thinning or the harvester starting to go downhill, the engine speed will increase. When the engine speed increases, the rotor and the cleaning fan speed increase proportionately.

In one prior art arrangement, the operator is able to select a desired new speed of the rotor or the fan using an operator input device such as a button, a knob, or a lever to select a desired new rotor or fan speed. In response to this, a control system increases or decreases the diameter of the variable pulley over a period of several seconds, until the speed of the rotor or fan reaches the desired new speed. Once the control system determines that the rotor or fan speed is at the desired new speed, it stops adjusting the diameter of the variable pulley. From that time on, as the engine speed changes, the rotor or fan speed changes proportionately, and the control system makes no further adjustment to the diameter of the variable pulley.

Unfortunately, this algorithm, while relatively simple, will not always give the results the operator anticipates. For example, since it takes a finite but nontrivial period of time for the control system to change the diameter of the pulley, occasionally the engine speed changes at the same time.

To illustrate the problem from the operator's perspective, imagine the following situation. The cleaning fan is operating at 1150 rpm and the engine is operating at 2300 rpm. The operator desires to reduce the fan speed to 1050 rpm, and operates the operator input device to select this speed. The control system, responding to the operator input device, begins the process of changing the diameter of the pulley to reduce the speed of the fan.

Shortly after the operator selects a desired new speed of 1050 rpm, the engine experiences a heavy load and the engine speed drops to 2100 rpm. When the engine speed drops to 2100 rpm, the cleaning fan speed drops automatically and coincidentally to the new target speed of 1050 rpm since the engine and the cleaning fan operate at speeds that are strictly proportional due to the fixed ratio gear train that couples them together.

The control system, even if it has made no change in the diameter of the pulley, senses that the fan is now running at the desired new speed of 1050 rpm. At this point, the control system ceases to adjust the diameter of the variable pulley, assuming that the control system adjustments are complete, based on the cleaning fan operating at the desired new speed. The control system stops adjusting the diameter of the pulley, even though it has made no adjustment to the diameter of the variable pulley.

The operator will immediately notice this failure to go to the desired new speed when the engine shortly recovers from its increased load and speeds back up to its normal operating speed of 2300 rpm. When this happens, the cleaning fan will again return to its original operating speed of 1150 rpm. The control system in effect mistakes the change in the cleaning fan speed caused by a temporary drop in the engine speed as actually setting a desired new cleaning fan speed.

What is needed in the art is a system for accommodating changes in engine speed while an adjustment is made to the cleaning fan (or threshing rotor) speed so that the operator's natural expectations are preserved.

SUMMARY OF THE INVENTION

The invention in one form is directed to a computer-controlled method of controlling the speed of an agricultural harvester load coupled to an agricultural harvester engine of an agricultural harvester by a power transmitting arrangement having various output speeds. The method includes the steps of electronically receiving a desired new load speed from an operator when the engine is operating at an initial engine speed and electronically driving the power transmitting arrangement through a sequence of the various output speeds until the actual speed of the agricultural harvester load and the actual speed of the agricultural harvester engine are in the same ratio to each other as the desired new load speed and the initial engine speed.

The step of electronically driving a variable pulley may further include the steps of repeatedly and electronically receiving the actual speed of the agricultural harvester engine from a first speed sensor; repeatedly and electronically receiving the actual speed of the agricultural harvester load from a second speed sensor; repeatedly and electronically calculating a ratio of the actual speeds of the harvester engine and the harvester load; repeatedly and electronically comparing the ratio of the actual speeds to a ratio of the new desired speed and the initial engine speed; and repeatedly and electronically changing the diameter of the variable pulley until the two ratios are the same.

The invention in another form is directed to an agricultural harvester including an agricultural harvester engine, an agricultural harvester load, a power transmitting arrangement, and a system for controlling the actual speed of the agricultural harvester load. The agricultural harvester engine has an actual speed when operating and the agricultural harvester load has an actual speed when operating. The power transmitting arrangement connects the load to the engine. The agricultural harvester load is coupled to the agricultural harvester engine of the agricultural harvester by the power transmitting arrangement. The system includes a first sensor coupled to the engine for sensing the actual speed of the engine and a second sensor coupled to the load for sensing the actual speed of the load. The system also includes a power transmitting arrangement, an operator input device, and a control unit. The power transmitting arrangement couples the load to the engine and is configured to provide a selectable plurality of speeds of the load for a given speed of the engine. The operator input device receives input from an operator of the agricultural harvester requesting a change in speed of the load to a revised load speed. The control unit receives a signal from the first sensor indicative of the actual speed of the engine, a signal from the second sensor indicative of the actual speed of load and a signal from the operator input device indicative of the desired load speed. The control unit calculates the ratio of the actual engine speed when the input is received from the operator to the desired load speed. The control unit sends a signal to the power transmitting arrangement to change the actual speed of the load to a different one of the selectable plurality of speeds corresponding to a speed having the same ratio to the actual speed of the engine as the desired load speed has to the actual engine speed when the input was received from the operator.

BRIEF DESCRIPTION OF THE DRAWINGS

The FIGURE shows an embodiment of a drive train of an agricultural harvester in accordance with the present invention.

DETAILED DESCRIPTION OF THE INVENTION

Referring now to the FIGURE, a drive train 100 of an agricultural harvester includes an engine 102 that is coupled to and drives a series of first mechanical drive elements 104, here illustrated in simplified form as a gear train 104, although it may be any combination of shafts, gears, belts, pulleys, or other mechanical drive elements. Mechanical drive elements 104 are coupled to a power transmitting arrangement 105. Power transmitting arrangement 105, as shown, includes a first pulley 106 which, in turn, is coupled to and drives a second pulley 108. Belt 110 couples the pulleys 106 and 108 together to transmit power therebetween. Pulley 106, pulley 108 and belt 110 form power transmitting arrangement 105 in the form of a pulley and belt arrangement 111. Pulley 108 is coupled to and drives a load 112, which may be, for example, the rotor of an agricultural harvester, or a cleaning fan. In this typical arrangement, all the mechanical elements in the drive train 100 rotate at speeds that are in fixed proportion to each other, unless, for example, the diameter of one of the pulleys is changed, or a gear ratio of a gearbox in drive train 100 is changed.

A first speed sensor 114 is coupled to one of the first mechanical drive elements 104 in the drive train 100 that is on the engine side of pulley and belt arrangement 111. In this embodiment, first speed sensor 114 is shown connected to engine 102. In alternative embodiments, first speed sensor 114 is connected to any of the first mechanical drive elements 104 between engine 102 and pulley 106. Wherever first speed sensor 114 is located, it provides a speed signal 115 proportional to the speed of one of the first mechanical drive elements 104 on the drive (i.e. the engine) side of pulley and belt arrangement 111.

A second speed sensor 116 is coupled to one of second mechanical drive elements 117 in the drive train 100 that is on the load side of pulley and belt arrangement 111. In this embodiment, speed sensor 116 is coupled directly to load 112. Alternatively, it could be connected to second pulley 108 or to any of the second mechanical drive elements 117 coupling second pulley 108 to load 112. Wherever second speed sensor 116 is located, it provides a speed signal 119 proportional to the speed of one of the second mechanical drive elements 117 on the load (i.e. the cleaning fan or threshing rotor) side of the pulley and belt arrangement 111.

Pulley 106 and/or 108 is a variable diameter pulley. By "variable diameter" we mean that the diameter of belt 110 as it travels over the pulley can be adjusted, typically by moving one side of the pulley closer to or further apart from the other side of the pulley, to close or, alternatively, to open the gap therebetween. Typically, the inner face of the sides of the pulley taper away from each other in the direction of the outer diameter of the pulley, so that belt 110 contacts the inner faces closer to the outside diameter when the sides that are closer together. As the belt moves closer to the outside diameter of the second pulley 108, the shaft supporting belt 110 rotates more slowly.

This adjustment can be affected by a mechanical device, such as a mechanical linkage that forces the pulley sides together, or it may be hydraulic, such as by a piston that is moved by hydraulic fluid under pressure to force the pulley sides together.

In the embodiment shown here, second pulley 108 is a variable diameter pulley, and is coupled to actuator 118 that is configured to change the diameter of second pulley 108 when so commanded by a control system 120.

Control system 120 is coupled to drive train 100 to vary the speed of agricultural harvester load 112 relative to agricultural harvester engine 102. Control system 120 includes an electronic control unit (ECU) 122, an operator input device 124 (here shown as a keyboard), and an operator signaling device 126 (here illustrated as a visual display). Input device 124 and signaling device 126 are communicatively coupled to ECU 122.

ECU 122 includes a digital microprocessor having random access memory (RAM), read only memory (ROM), and signal conditioning circuits that permit ECU 122 to drive operator signaling device 126 and to receive and process signals 123 from operator input device 124, to receive and process signals from speed sensors 114 and 116, and to transmit signals sufficient to drive actuator 118. ECU 122 is configured to indicate a speed of load 112 with signaling device 126, preferably by displaying the speed as numeric values on visual display device 126. ECU 122 is configured to receive speed command signals that the operator enters using operator input device 124.

ECU 122 is also coupled to speed sensors 114 and 116 to receive signals therefrom that indicate the speed of one of the mechanical drive element 104 on the drive side of the pulley and belt arrangement 111 (in this case the engine) and to receive signals that indicate the speed of one of the second mechanical drive elements 117 on the load side of pulley and belt arrangement 111 (in this case, agricultural harvester load 112).

ECU 122 is also coupled to actuator 118 to drive actuator 118 and, thereby, to change the diameter of second pulley 108. In this embodiment, actuator 118 is configured to vary the diameter of second pulley 108. In other embodiments (not shown) first pulley 106 is a variable diameter pulley and actuator 118 is coupled to pulley first 106 to vary the diameter of first pulley 106. In operation, ECU 122 continuously monitors the speed of load 112, reading second speed sensor 116 and displaying it on signaling device 126. Whenever the operator wishes to change the speed of load 112, he manipulates operator input device 124 to select a desired new speed for load 112, and this desired new speed is transmitted to ECU 122.

On receipt of this speed, ECU 122 transmits the desired load speed to operator signaling device 126. ECU 122 also reads the actual engine speed indicated by speed sensor 114 at the same time and calculates a new speed ratio. The speed ratio being the desired new load speed divided by the actual engine speed at the moment the operator selected the desired new load speed and therefore before the engine speed has a chance to change significantly.

It is this new speed ratio that the control system 120 uses to vary the diameter of second pulley 108. Once ECU 122 has established the new speed ratio (which can be thought of generally as the ratio of engine speed to load speed), ECU 122 sends a signal to actuator 118 to change the diameter of second pulley 108.

As the diameter of second pulley 108 changes, load 112 on the engine 102 may change, either due to decreasing or increasing the load on engine 102 because the diameter of second pulley 108 is changing, or because of external conditions, such as changing ground terrain or density of the crop.

When ECU 122 changes the diameter of second pulley 108, it also reads speed signals from first speed sensor 114 and second speed sensor 116 and calculates a ratio of the two. This instantaneous speed ratio changes as the diameter of second pulley 108 changes, the ratio gradually approaching the new speed ratio established at the outset of the speed change process. The diameter of second pulley 108 is typically not changed randomly, but is gradually moved stepwise from a smaller to a larger diameter, or a larger to a smaller diameter, depending on which change will cause the actual speed ratio to approach the new speed ratio.

If, for some reason, the actual speed ratio overshoots the new speed ratio during this adjustment process (i.e. the 2 speed ratios pass each other in value and start growing farther and farther apart), ECU 122 is configured to reverse the direction of change of the diameter of the variable pulley in order to make the actual speed ratio again approach the new speed ratio.

ECU 122 is configured to keep sequentially repeating these steps of changing the diameter of second pulley 108 and reading the speed signals from speed sensors 114 and 116 until eventually the instantaneous speed ratio equals the new speed ratio (or alternatively comes within a predetermined value from the new speed ratio). When this happens, ECU 122 is configured to stop changing the diameter of second pulley 108 and exit its speed control loop until the operator enters another desired new load speed, at which time the entire process is repeated.

By controlling the diameter of the variable pulley based upon the ratio of engine speed to rotor speed instead of controlling the diameter of the variable pulley based upon the rotor speed alone, control system 120 becomes immune to any drift or change in engine speed as ECU 122 changes the diameter of second pulley 108.

Once the speed changing process terminates, and once the load 112 on the engine 102 returns to its typical operating load and the engine speed will return to its original speed, i.e. the engine speed at the time the operator originally requested a desired new load speed, and the actual speed of load 112 will equal the desired new load speed.

Using this process, control system 120 is rendered immune to transient changes in engine speed, and the operator achieves what he desires: the load rotating at the desired speed when engine 102 is running at its initial speed.

The actual calculations described above need not be performed in the order they are described. The calculations can proceed in any order as long as the result is changing the diameter of second pulley 108 until it permits the engine and the load to rotate with respect to each other at speeds that are proportional to the initial engine speed and the desired load speed selected by the operator. Changing the order of calculations to any arbitrary sequence is well known to programmers skilled in the art.

Having described the preferred embodiment, it will become apparent that various modifications can be made without departing from the scope of the invention as defined in the accompanying claims.

What is claimed is:

1. A system for controlling the speed of an agricultural harvester load that is coupled to an agricultural harvester engine of an agricultural harvester by a power transmitting arrangement, said system comprising:

a first sensor coupled to the engine for sensing the actual speed of the engine;

a second sensor coupled to the load for sensing the actual speed of the load;

a power transmitting arrangement coupling the load to the engine and configured to provide a selectable plurality of speeds of the load for a given speed of the engine;

an operator input device configured to receive input from an operator of the agricultural harvester requesting a change in speed of the load to a desired load speed; and a control unit for receiving a signal from the first sensor indicative of the actual speed of the engine, a signal from the second sensor indicative of the actual speed of load and a signal from the operator input device indicative of the desired load speed, said control unit calculating a ratio of the actual engine speed when the input was received from the operator to the desired load speed, said control unit configured to send a signal to the power transmitting arrangement to change the actual speed of the load to a different one of the selectable plurality of speeds corresponding to a speed having the same ratio to the actual speed of the engine after the actual speed of the load has been changed, as the revised load speed has to the actual engine speed when the input was received from the operator.

2. The system of claim 1, further comprising an actuator for actuating the power transmitting arrangement, the control unit being configured to send a signal to the actuator to provide a selected one of the plurality of speeds of the load corresponding to the desired load speed.

3. The system of claim 1, wherein the power transmitting arrangement is a variable pulley and belt arrangement having a variable pulley and a belt, wherein the control unit configured to record the actual speed of the engine when the input from the operator is received by the control unit and records that actual speed as an initial engine speed, said control unit being adapted to drive the variable pulley of the pulley and belt arrangement through a sequence of new pulley diameters until the actual speed of the agricultural harvester load and the actual speed of the agricultural harvester engine are in substantially the same ratio to each other as the desired load speed and the actual engine speed when the input was received from the operator.

4. The system of claim 1, wherein said control unit is configured to repeatedly and electronically receive the actual speed of the agricultural harvester engine from the first speed sensor, repeatedly and electronically receive the actual speed of the agricultural harvester load from a second speed sensor, repeatedly and electronically calculate a ratio of the actual speeds of the harvester engine and the harvester load, repeatedly and electronically compare the ratio of the actual speeds to a ratio of the desired load speed and the actual engine speed when the input was received from the operator, and repeatedly and electronically change the diameter of the variable pulley until the two ratios are the same.

5. The system of claim 1, wherein control unit is an electronic device.

6. The system of claim 1, wherein the operator input device is one of a keyboard, a computer mouse, a knob and a lever.

7. The system of claim 1, wherein the power transmitting arrangement is a pulley and belt arrangement.

8. The system of claim 7, wherein the pulley and belt arrangement comprises a first pulley that is connected to and driven by the agricultural harvester engine, a second pulley that is connected to the agricultural harvester load, and a belt that is disposed between and couples the first pulley and the second pulley.

9. An agricultural harvester comprising:
   an agricultural harvester engine having an actual speed when operating;
   an agricultural harvester load having an actual speed when operating;
   a power transmitting arrangement connecting the load to the engine; and
   a system for controlling the actual speed of said agricultural harvester load that is coupled to said agricultural harvester engine of the agricultural harvester by said power transmitting arrangement, said system including:
      a first sensor coupled to the engine for sensing the actual speed of the engine;
      a second sensor coupled to the load for sensing the actual speed of the load;
      a power transmitting arrangement coupling the load to the engine and configured to provide a selectable plurality of speeds of the load for a given speed of the engine;
      an operator input device configured to receive input from an operator of the agricultural harvester requesting a change in speed of the load to a desired load speed; and
      a control unit configured to receive a signal from the first sensor indicative of the actual speed of the engine, a signal from the second sensor indicative of the actual speed of load and a signal from the operator input device indicative of the desired load speed, the control unit further configured to calculate a ratio of the actual engine speed when the input was received from the operator to the desired load speed, the control unit further configured to send a signal to the power transmitting arrangement to change the actual speed of the load to a different one of the selectable plurality of speeds corresponding to a speed having substantially the same ratio to the actual speed of the engine after the actual speed of the load has been changed, as the revised load speed has to the actual engine speed when the input was received from the operator.

10. The system of claim 9, further comprising an actuator for actuating the power transmitting arrangement, the control unit being configured to send a signal to the actuator to provide a selected one of the plurality of speeds of the load corresponding to the desired load speed.

11. The system of claim 9, wherein the power transmitting arrangement is a variable pulley and belt arrangement having a variable pulley and a belt,
   the control unit being configured to record the actual speed of the engine when the input from the operator is received by the control unit and records that actual speed as an initial engine speed, the control unit being adapted to drive the variable pulley of the pulley and belt arrangement through a sequence of new pulley diameters until the actual speed of the agricultural harvester load and the actual speed of the agricultural harvester engine are in substantially the same ratio to each other as the desired load speed and the actual engine speed when the input was received from the operator.

12. The system of claim 9, wherein said control unit is configured to repeatedly and electronically receive the actual speed of the agricultural harvester engine from the first speed sensor, repeatedly and electronically receive the actual speed of the agricultural harvester load from a second speed sensor, repeatedly and electronically calculate a ratio of the actual speeds of the harvester engine and the harvester load, repeatedly and electronically compare the ratio of the actual speeds to a ratio of the desired speed and the actual engine speed when the input was received from the operator, and repeatedly and electronically change the diameter of the variable pulley until the two ratios are substantially the same.

13. The system of claim 9, wherein the operator input device is one of a keyboard, a computer mouse, a knob and a lever.

14. The agricultural harvester of claim 9, wherein the power transmitting arrangement is a pulley and belt arrangement.

15. The agricultural harvester of claim 14, wherein the pulley and belt arrangement includes a first pulley that is connected to and driven by the agricultural harvester engine, a second pulley that is connected to the agricultural harvester load, and a belt that is disposed between and couples the first pulley and the second pulley.

* * * * *